US006512816B1

(12) United States Patent
Panasik et al.

(10) Patent No.: US 6,512,816 B1
(45) Date of Patent: Jan. 28, 2003

(54) TEMPERATURE CLOCK FOR X-RAY TUBES

(75) Inventors: Cheryl L. Panasik, Elburn, IL (US); Daniel E. Kuzniar, Lyons, IL (US)

(73) Assignee: Koninklijke Philips Electronics, N.V. (NL)

( * ) Notice: Subject to any disclaimer, the term of this patent is extended or adjusted under 35 U.S.C. 154(b) by 0 days.

(21) Appl. No.: 09/973,633

(22) Filed: Oct. 9, 2001

(51) Int. Cl.[7] .......................... H01J 35/02; G01K 3/00; G01K 11/00

(52) U.S. Cl. ...................... 378/127; 378/117; 378/118; 116/216; 374/106; 374/160; 374/162

(58) Field of Search ................................ 378/117, 118, 378/127; 116/216; 374/106, 160, 162

(56) References Cited

U.S. PATENT DOCUMENTS 4,918,714 A * 4/1990 Adamski et al. ............ 378/121
5,497,410 A * 3/1996 Behling ...................... 378/202
5,809,106 A * 9/1998 Kitade et al. ............... 378/132
5,982,849 A * 11/1999 Bischof ...................... 378/130
6,449,337 B1 * 9/2002 Honda et al. ............... 378/117

* cited by examiner

*Primary Examiner*—Drew A. Dunn
*Assistant Examiner*—Allen C. Ho
(74) *Attorney, Agent, or Firm*—Eugene E. Clair

(57) ABSTRACT

An x-ray system 20 includes an x-ray tube insert (24) that has an evacuated envelope (34), an anode assembly (38) and a cathode assembly (40). The anode assembly (38) and the cathode assembly (40) are located in operative relationship to one another within the evacuated envelope (34). A temperature indicating member (100) is located in thermally conductive contact with at least one assembly (38, 40, 66) located in the x-ray tube insert (24). The temperature indicating member (100) has a temperature sensitive characteristic which changes in response to adequate thermal exposure to at least one temperature threshold value.

20 Claims, 3 Drawing Sheets

TEMPERATURE CLOCK FOR X-RAY TUBES

BACKGROUND

The present invention relates to x-ray tubes and is particularly related to an apparatus that provides an indication of a specific temperature value reached by a component or fluid in an x-ray tube system. The present invention finds particular application in conjunction with indicating the temperature reached by bearing assembly components in a rotating anode x-ray tube and will be described with particular respect thereto.

Typically, an x-ray tube includes an evacuated envelope made of metal or glass which is supported within an x-ray tube housing. The x-ray tube housing provides electrical connections to the envelope and is filled with a fluid such as oil to aid in cooling components housed within the envelope. The fluid is circulated through the housing and a heat exchanger external to the housing for removing heat from the cooling fluid. The envelope and the x-ray tube housing each include an x-ray transmissive window aligned with one another such that x-rays produced within the envelope may be directed to a patient or subject under examination.

In order to produce x-rays, the envelope houses a cathode assembly and an anode assembly. The cathode assembly includes a cathode filament through which a heating current is passed. This current heats the filament sufficiently that a cloud of electrons is emitted, i.e. thermionic emission occurs. A high potential, on the order of 100–200 kV, is applied between the cathode assembly and the anode assembly. This potential causes the electrons to flow from the cathode assembly to the anode assembly through the evacuated region in the interior of the envelope. A cathode focusing cup containing the cathode filament focuses the electrons onto a small area or focal spot on a target of the anode assembly. The electron beam impinges the target with sufficient energy that x-rays are generated. Accordingly, the accelerated emitted electrons gain considerable kinetic energy before striking the target. Creation of x-rays in this manner is an inefficient process with less than one percent of the electron energy being converted into usable x-ray energy. A substantial portion of the remaining energy is released as heat acquired by the anode which is dissipated and transferred through the components in the x-ray tube. For example, some heat from the anode is radiated through the envelope while some is conducted through an anode stem to the other components.

In order to distribute the thermal loading created during the production of x-rays, a rotating anode assembly configuration has been adopted for many applications. In this configuration, the anode assembly is rotated about an axis such that the electron beam focused on a focal spot of the target impinges on a continuously rotating circular path about a peripheral edge of the target. Each portion along the circular path becomes heated to a very high temperature during the generation of x-rays and is cooled as it is rotated before returning to be struck again by the electron beam. In many high powered x-ray tube applications such as CT, the generation of x-rays often causes portions of the anode assembly to be heated to a temperature range of 1200–1400° C., for example.

In order to provide for rotation, the anode is typically mounted via an anode stem to a rotor which is rotated by an induction motor. The rotor in turn is rotatably supported by a bearing assembly. The bearing assembly provides for a smooth rotation of the rotor and anode about its axis. The bearing assembly typically includes at least two sets of ball bearings disposed in a bearing housing. The ball bearings often consist of a ring of metal balls which are lubricated by application of lead or silver to an outer surface of each ball thereby providing support to the rotor with minimal frictional resistance.

During operation of the x-ray tube, the anode assembly is passively cooled by use of oil or other cooling fluid flowing within the housing which serves to absorb heat radiated by the anode assembly through the envelope. However, a portion of the heat radiating from the anode assembly is also absorbed by the rotor and bearing assembly. For example, heat radiated from the anode assembly has been found to subject the bearing assembly to temperatures of approximately 400° C. in many high powered applications. Furthermore, given that the bearing assembly is enclosed by the rotor, the bearing assembly is not able to easily radiate heat to the cooling fluid contained in the housing as done by the anode assembly. In fact, some rotor and bearing assembly configurations operate as a heat sink. For these reasons, a substantial amount of heat is typically transferred into the bearing assembly and the heat is not readily dissipated.

Unfortunately, such heat transfer to the bearings may deleteriously effect the bearing performance. For instance, prolonged or excessive heating to the solid lubricant applied to each ball of a bearing can reduce the effectiveness of such lubricant. When thermal loads greater than desired are applied to the solid lubricants on the bearings, the lubricant can evaporate thereby increasing friction in the bearing and contaminating the vacuum in the envelope. The increased friction in the bearings can lead to premature bearing failure and the evaporated lubricant within the evacuated envelope can result in arcing, which also deleteriously affects x-ray tube service life.

During operation in the field it is possible, or in a life critical situation necessary, for the x-ray technician to operate an x-ray tube at operating conditions that result in x-ray tube components experiencing temperatures that exceed design specifications. In addition to field operation, various processes during manufacture of the tube, such as exhausting and seasoning the tube, also subject an x-ray tube to high thermal loads. Exhausting the tube is the process in which vacuum is drawn in the tube. The tube is operated with internal components at high temperatures while a vacuum pump is operatively attached to the tube. The rate at which gas is removed from the tube and the resulting final pressure of the tube are related to the temperature of the components, such as the anode, during exhaust. The higher the temperature of the component the more effectively the gas is removed from the tube and the lower the pressure of the tube after exhaust. The bearing temperature limit results in reducing the temperature that the components can reach during exhaust.

Seasoning also produces considerable thermal loading for various x-ray tube components. Seasoning is the process in which the tube is exposed to progressively higher voltages and power. This “burn in” procedure assists in making the tube more electrically stable at high voltages experienced during tube operation. During the seasoning process the anode target focal track is exposed to some of the highest temperatures that it will experience. During seasoning, the focal track of the anode outgasses and evolves gas molecules into the vacuum envelope, thereby raising the gas pressure. The evolved gasses are absorbed by a getter within the vacuum envelope.

Damage to x-ray tubes due to thermal loading greater than design specifications can result in warranty claims and decreased product performance. Knowledge regarding temperature levels reached by components in x-ray tubes during field operation, exhaust and seasoning can result in design improvements, improved quality control as well as assist with resolution of warranty claims. For these reasons, it is desirable to have an indication of exposure of x-ray tube system components to temperature thresholds during operation and manufacture. This temperature information is useful to improve tube and system design, improve quality control, resolve warranty claims and assist in determining root cause of tube failure.

SUMMARY OF THE INVENTION

The present invention is directed to an x-ray tube with a temperature log apparatus that satisfies the need to provide an observable change in a temperature indicating member which is useful to record when a component of an x-ray tube has been adequately exposed to a particular temperature threshold value. An apparatus in accordance with one embodiment applying principles of the present invention includes an x-ray tube comprising an insert that has an evacuated envelope, an anode assembly and cathode assembly. The anode assembly and cathode assembly are located in operative relationship to one another within the evacuated envelope. A temperature indicating member is located in thermally conductive contact with a component of one of the assemblies located in the insert. The temperature indicating member has a temperature sensitive characteristic which results in an observable change in the temperature indicating member in response to adequate thermal exposure to at least one temperature threshold value.

In accordance with one aspect of an apparatus applying principles of the invention, the temperature sensitive characteristic of the temperature indicating member is a change in color. In one such application of the apparatus, the change in color of the temperature indicating member is irreversible.

In accordance with another apparatus applying aspects of the present invention, the temperature sensitive characteristic of the temperature indicating member is a change in physical state of the member. This change in state results in an observable change in the shape or structure of the member.

In yet another application of an apparatus including principles of the invention, a frame supports the temperature indicating member. The frame is adapted to be located in direct thermal contact with the component of the assembly in the insert. In one implementation of such an apparatus, the frame has a recess for receiving the temperature indicating member. In a further adaptation of this apparatus, a cover retains the temperature indicating member within the recess. A particular implementation of this adaptation includes a recess that is threaded and the cover is a set screw received in the threaded recess.

In accordance with another aspect of an apparatus applying principles of the present invention, the temperature sensitive characteristic provides a first observable change in the temperature indicating member which indicates adequate exposure to a first temperature threshold value and a second observable change in the same temperature indicating member for indicating adequate exposure to a second temperature threshold value different than the first threshold temperature value.

In another application of an apparatus applying principles of the present invention, the apparatus includes a first temperature indicating member and a different second temperature indicating member. The first temperature indicating member has a temperature sensitive characteristic for indicating adequate exposure to a first temperature threshold value and the second temperature indicating member has a temperature sensitive characteristic for indicating adequate exposure to a second temperature threshold value that is different than the first threshold temperature value.

In yet another embodiment of an apparatus applying principles of the present invention, the temperature sensitive characteristic of the first temperature indicating member is a different temperature sensitive characteristic than the temperature sensitive characteristic of the second temperature indicating member.

In accordance with another aspect of the invention, a method is provided for determining whether a component within an envelope of an x-ray tube has been exposed to a temperature threshold value. The method includes securing a temperature indicating member at a selected location of a component of the x-ray tube within the evacuated envelope of the x-ray tube. The temperature indicating member has a temperature sensitive characteristic for observably indicating whether a temperature threshold value has been exceeded. Next, a voltage and current is applied to the anode assembly and cathode assembly tube such that heat is produced in the x-ray tube. The temperature indicating member is analyzed to determine whether it has had adequate exposure to a temperature threshold.

In one implementation of an apparatus applying the method principles of the present invention, the step of securing the temperature indicating member is accomplished by mounting the temperature indicating member to a frame and placing the frame in thermally conductive contact with the selected location of the component.

Analyzing the temperature indication member includes retrieving the frame retaining the temperature indicating member from within the envelope and opening the frame to expose the temperature indicating member to determine whether there has been adequate exposure to the temperature threshold value.

One advantage of the present invention is that the apparatus provides a simple and obvious indication of whether a component within the vacuum envelope of an x-ray tube has been adequately exposed to at least one threshold temperature value.

An apparatus and method applying principles of the present invention provides the foregoing and other features hereinafter described and particularly pointed out in the claims. The following description and accompanying drawings set forth certain illustrative embodiments applying principles of the present invention. It is to be appreciated that different embodiments applying principles of the invention may take form in various components and arrangements of components. These described embodiments being indicative of but a few of the various ways in which the principles of the invention may be employed. The drawings are only for the purpose of illustrating a preferred embodiment of an apparatus applying principles of the present invention and are not to be construed as limiting the invention.

BRIEF DESCRIPTION OF THE DRAWINGS

The foregoing and other features and advantages of the present invention will become apparent to those skilled in the art to which the present invention relates upon consideration of the following detailed description of an embodiment that applies principles of the invention with reference to the accompanying drawings, wherein.

DETAILED DESCRIPTION

Figure 1:
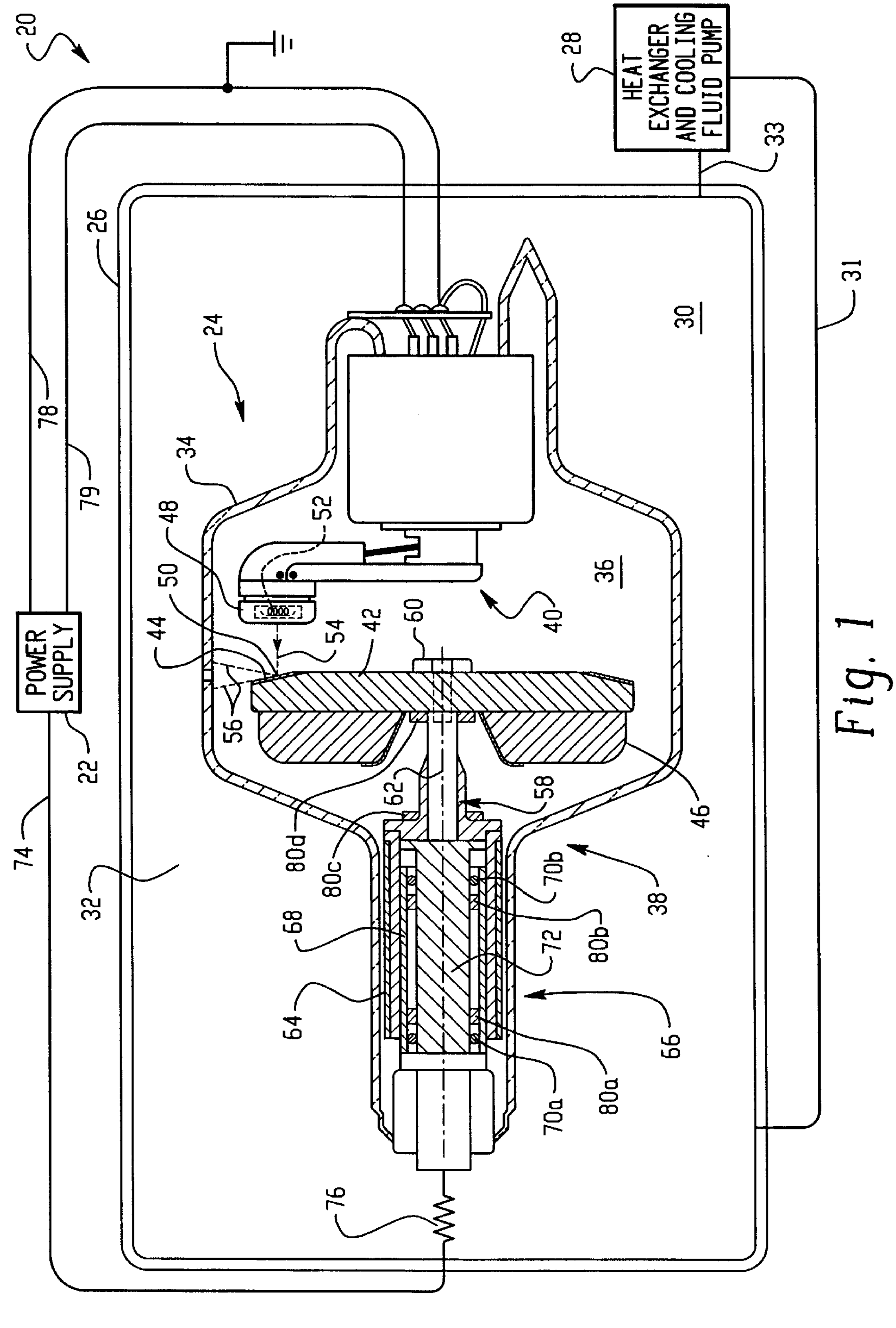
FIG. 1 is a partial sectional schematic representation of an x-ray system showing features of an embodiment that applies principles of the present invention.

With reference to FIG. 1, a schematic representation of an x-ray producing system 20 is shown which illustrates aspects of the present invention. It is to be appreciated that the x-ray system 20 may be one that is employed in any of the conventional diagnostic or industrial uses of x-radiation including but not limited to (i) radiography, in which a still shadow image of a patient is produced on x-ray film, (ii) fluoroscopy, in which a visible real time shadow light image is produced by low intensity x-rays impinging on a fluorescent screen after passing through the patient, (iii) computed tomography (CT) in which complete patient images are digitally constructed from x-rays produced by a high powered x-ray tube rotated about a patient's body, (iv) industrial inspection and (v) security systems.

The system 20 includes a high voltage power supply 22, an x-ray tube 24 mounted within a housing 26 and a heat exchanger 28. The x-ray tube 24, also commonly referred to as an insert, is securely mounted with tube supports (not shown) in a conventional manner within the x-ray tube housing 26. The housing 26 is filled with a cooling fluid 30, for example diala oil, however it will be appreciated that other suitable cooling fluid/medium could alternatively be used. The oil 30 is pumped through a supply line 31 into a chamber 32, defined by the x-ray tube housing 26, which surrounds the x-ray tube 24. The pumped oil 30 absorbs heat from the x-ray tube 24 and exits the housing 26 through a line 33 connected to the heat exchanger 28 disposed outside the x-ray tube housing 26. The heat exchanger 28 includes cooling fluid pump.

The x-ray tube 24 includes an envelope 34 defining an evacuated chamber or vacuum 36. The envelope 34 is made of glass although other suitable material including other ceramics, metals or combinations thereof, could also be used. Disposed within the envelope 34 is an anode assembly 38 and a cathode assembly 40. The anode assembly 38 includes a circular target substrate 42 having a focal track 44 along a peripheral edge of the target 42. The focal track 44 is comprised of a tungsten alloy or other suitable material capable of producing x-rays when bombarded with electrons. The anode assembly 38 further includes a back plate 46 made of graphite to aid in cooling the target 42.

The anode assembly 38 includes a bearing assembly 66 for rotatably supporting the target 42. The target 42 is mounted to a rotor stem 58 using securing nut 60. The rotor stem 58 is connected to a rotor body 64 which is rotated during operation about an axis of rotation 62 by an electrical stator (not shown). The rotor body 64 houses the bearing assembly 66 which provides support thereto. The bearing assembly 66 includes a bearing housing 68, ball bearings 70*a*, 70*b*, and a bearing shaft 72. The bearing shaft 72 is coupled to the rotor body 64 and rotatably supports the anode target 42.

The cathode assembly 40 is stationary in nature and includes a cathode focusing cup 48 operatively positioned in a spaced relationship with respect to the focal track 44 for focusing electrons to a focal spot 50 on the focal track 44. A cathode filament 52 (shown in phantom) mounted to the cathode focusing cup 48 is energized to emit electrons 54 which are accelerated to the focal spot 50 to produce x-rays 56.

The power supply 22 provides high voltage of 70 kV to 100 kV to the anode assembly 38 through a high voltage conductor 74 and a resistor 76 that is located within the cooling fluid filled housing 26. The cathode assembly 40 is suitably connected to the power supply 22 with conductors 78, 79 to provide necessary operating power for the x-ray tube.

Temperature log devices 80*a*, 80*b*, 80*c* and 80*d* are shown at a number of locations within the insert at which it is desirable to have an indication of whether the particular component of the x-ray tube has exceeded a specific temperature value. The locations for the temperature log devices 80*a–d* are representative of some locations inside the insert for which temperature indications are desired. Temperature log devices 80*a,b* are located on the bearing shaft 72 to provide indications of temperature values exceeded near the bearings 70*a,b*. Temperature log device 80*c* is located to obtain a temperature indication of the rotor stem 58 near the bearing assembly 66. Temperature log device 80*d* is located on the rotor stem 58 at the target 42. It is to be appreciated that additional locations on components of the x-ray tube can be equipped with temperature indicating devices and that use of the present invention is not limited to the representative locations illustrated in FIG. 1.

Figure 2B:
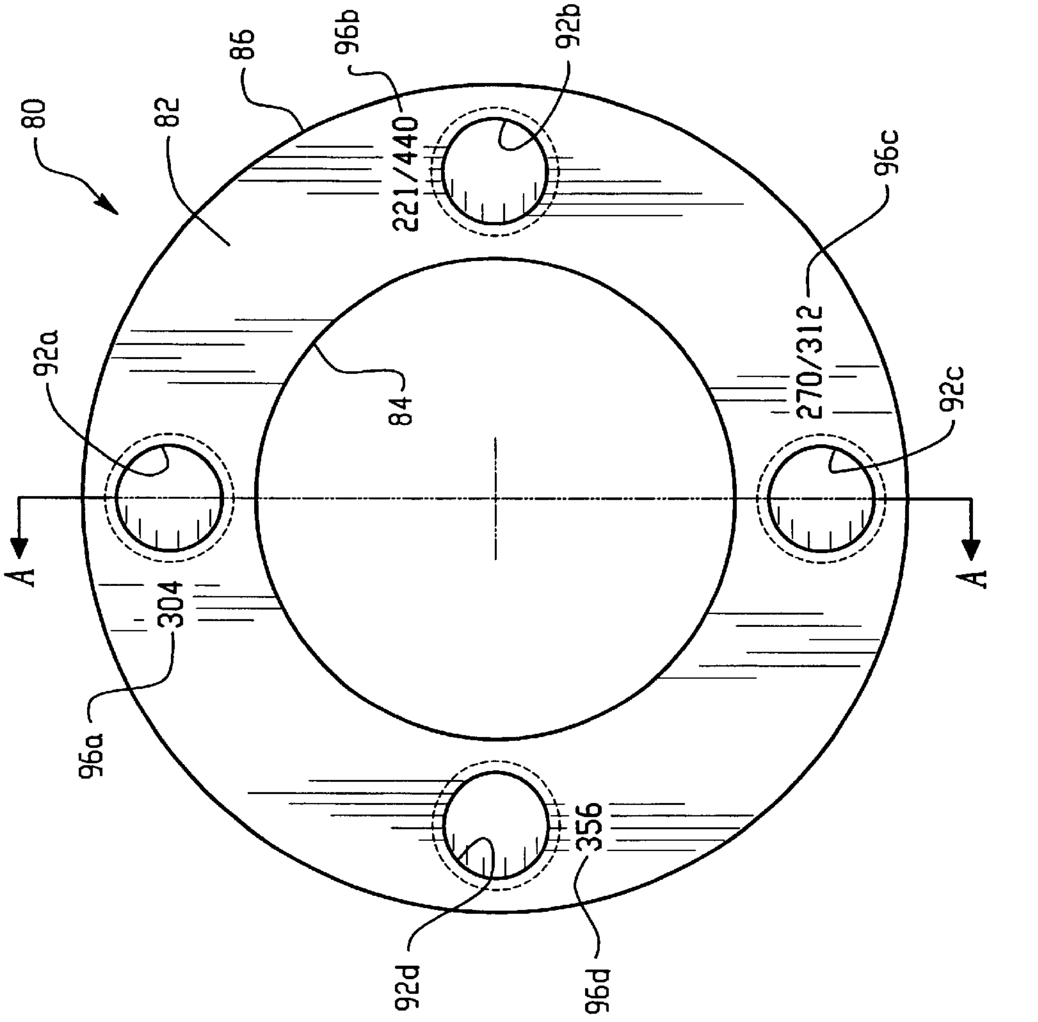
FIG. 2B is a planar schematic representation of a temperature log apparatus illustrating features of the present invention.
Figure 2A:
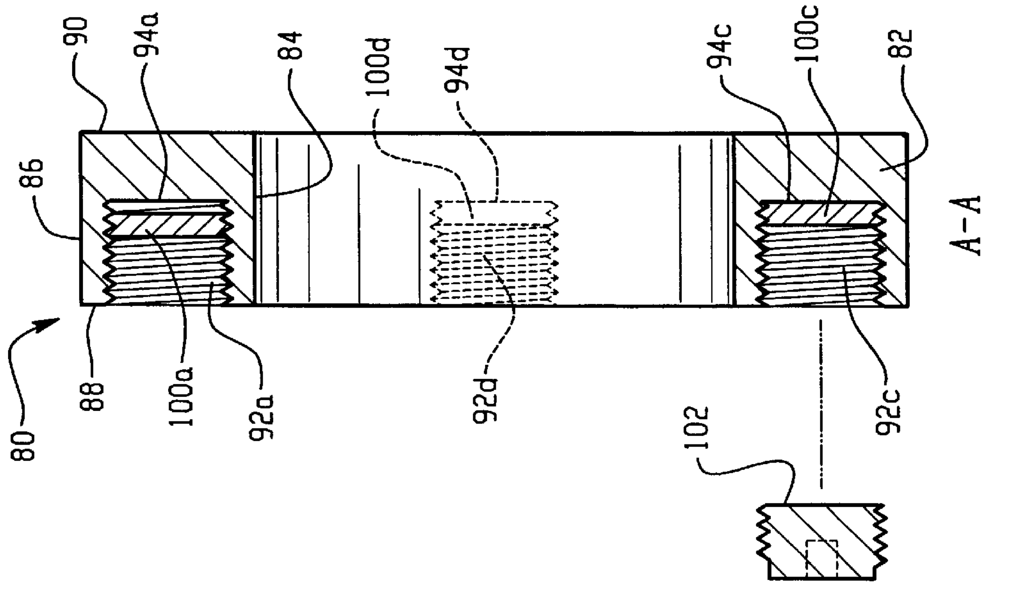
FIG. 2A is a sectional schematic representation of a temperature log apparatus of FIG. 2B along the line A—A and illustrating features of an embodiment that applies principles of the present invention.

FIGS. 2A and 2B show different views of one configuration of a temperature log 80 illustrating features of the present invention. The temperature log 80 includes a frame 82 comprised of stainless steel. The frame 82 is an annular member having a first surface 88 and a second surface 90. An inner circular wall 84 and an outer circular wall 86 each extend from the first surface 88 to the second surface 90. The diameter of the circular inner wall 84 and circular outer wall 86 are selected so as to permit the indicator 80 to be placed in thermally conductive contact on a desired component of the x-ray tube. In this configuration showing features of the present invention, the diameter of the inner surface 84 is selected to receive the bearing shaft 72 and the diameter of the outer surface 86 is selected to be received along a cylindrical wall section of a bearing housing 68. It is to be appreciated that the shape of frame need not be limited to annular configurations and the frame can be adapted to suitably contact a desired component of an x-ray tube to provide a thermal path to the indicating member in accordance with the principles of the invention.

Threaded bores 92*a–d* extend partially through the frame 82 from the first surface 88 toward the second surface 90. Each of the threaded bores 92*a–d* has a closed end 94*a–d*. Temperature indicating members 100*a–d* are sized and adapted to be securely retained within the threaded bores 92*a–d* toward the closed end 94*a–d* such that the members 100 remain within their associated bore 92 during x-ray tube operation. The number of bores is not limited to the number shown in FIGS. 2A and 2B.

A set screw 102 is adapted to be received in the threaded bore 92*c*. The set screw 102 is provided, when desired, to seal the bore and retain the temperature indicator 100*c* within the bore 92 to keep it from contaminating the vacuum of the evacuated envelope.

The temperature indicating members 100 have a suitable temperature sensitive characteristic to provide an observable change in the member for use in accordance with aspects of the present invention. One such example is a visible characteristic of a material that is affected by temperature. For example, suitable visible indicators include color change or change in physical state (resulting in a change in shape or structure of the member upon heating and subsequent cooling, from its original shape, due to change in physical state). The temperature sensitive characteristic of the material changes in response to adequate exposure to a temperature threshold value or exceeding that temperature threshold value. A temperature threshold value that results in a change in the temperature sensitive characteristic of the material from an original state to a first changed state, or even additional changed states for multiple different threshold temperature values, provides a record of whether a particular threshold temperature value or values, were met or exceeded during operation of the x-ray tube.

Suitable materials for use in an embodiment applying principles of the present invention includes materials having a temperature sensitive characteristic that exhibits a change in physical state at threshold temperature values. Such threshold temperature values include any of a melting point, a solidus point and/or a liquidus point. These temperature values provide known temperature levels at which there is resultant observable physical evidence of the change in physical state made apparent by a corresponding change in crystal structure or physical shape of the member 100. For example, a solid material having an initial specific shape has a different second shape once it transitions through its melting point and re-solidifies upon cooling. This second different shape is an observable result that at least a portion of the material changed physical state from a solid to a liquid at a threshold temperature and back to a solid state. The table below provides examples of a number of alloys showing associated temperature threshold values that provide observable indication of changes related to the temperature sensitive characteristic for use in accordance with aspects of the invention.

| Alloy | Solidus Temperature | Liquidus Temperature |
|---|---|---|
| 80 Au–20 Sn | 280° C. | 280° C. |
| Solder 95 Pb–5 Sn | 270° C. | 312° C. |
| Solder 97.5 Pb–2.5 Ag (ASTM 2.5 S) | 304° C. | 304° C. |
| 88 Au–12 Ge | 356° C. | 356° C. |
| 30 Ag–70 Sn | 221° C. | 410° C. |
| 37 Ag–63 Sn | 221° C. | 440° C. |

One skilled in the art will appreciate that other materials, including non-metallic materials, can be used in the present invention to provide observable changes in characteristics of the material that are temperature threshold related. Additional examples of materials suitable for use as temperature indicating members 100 (i) that have melting point as the temperature sensitive characteristic are available as Tempil® Temperature Indicating Pellets and (ii) that have change of color as the temperature sensitive characteristic are available as Temp-Alarm time/temperature indicating paint for single temperature threshold and color changes as well as multiple transition temperatures and color changes. These materials are available from Tempil, Inc., of South Plainfield, N.J. The change in color can be irreversible or can revert back to an original color upon cooling if the member is observable while the particular assembly is at the threshold temperature. For example, assemblies within the insert are observable during the seasoning and exhaust processes of manufacturing.

Referring again to FIG. 2, temperature threshold indicator markings 96*a–d* are placed on the surface 88 of the frame 82 at an associated bore 92. The markings may be stamped, etched or otherwise placed near their associated bores 92 in a manner that will not be made illegible for their purposes under the operating conditions experienced in the x-ray tube. Each temperature threshold indicator marking provides a marking used to indicate the temperature threshold value for the temperature indicating member contained within the associated bore. The marking may be the actual temperature threshold value or other indicator mark or symbol that can be cross referenced with tables or records to obtain actual temperature threshold value for the temperature indicating member in the associated bore. The indicator markings may be a single indicator marking for a single threshold temperature indicating member, such as the alloy 80Au-20Sn shown above which has a melting point of 280° C.

In addition, a single indicating member is provided which indicates a plurality of different observable changes in the indicating member for multiple temperature threshold values. For example, the alloy 30Ag-70Sn shown above, is used to indicate adequate exposure to one or more temperature threshold values. This multi-temperature indicating member uses multiple change of state temperature values to indicate adequate exposure of the member to multiple temperature threshold values. In particular, the solidus and liquidus temperature values of some materials provide two values at which a temperature sensitive characteristic, e.g. change of physical state or crystal structure, makes distinct observable indications of adequate exposure to specific and different temperature threshold values. The solidus temperature is that temperature in a phase equilibrium diagram below which no liquids are present; the highest temperature at which a metal or alloy is completely solid. The liquidus temperature is the line on the phase equilibrium diagram above which only liquids are stable and below which some solid is present; the lowest temperature at which a metal or alloy is completely liquid.

Below the solidus temperature, the indicating member 100 has an original observable shape and structure. Upon adequate exposure to a temperature above the solidus temperature, solids and liquids exist in equilibrium. Upon cooling, the temperature indicator has an observable change in shape and/or structure which is different from the original indicator member shape or structure. Upon exposure to a temperature above the liquidus temperature and subsequent cooling, the resultant shape and/or structure of the temperature indicator member will have yet another different observable condition that the previously described shapes or structures of the indicating member. As such, a single indicating member provides separate and distinct observable changes for a plurality of different threshold temperature values.

Figure 3:
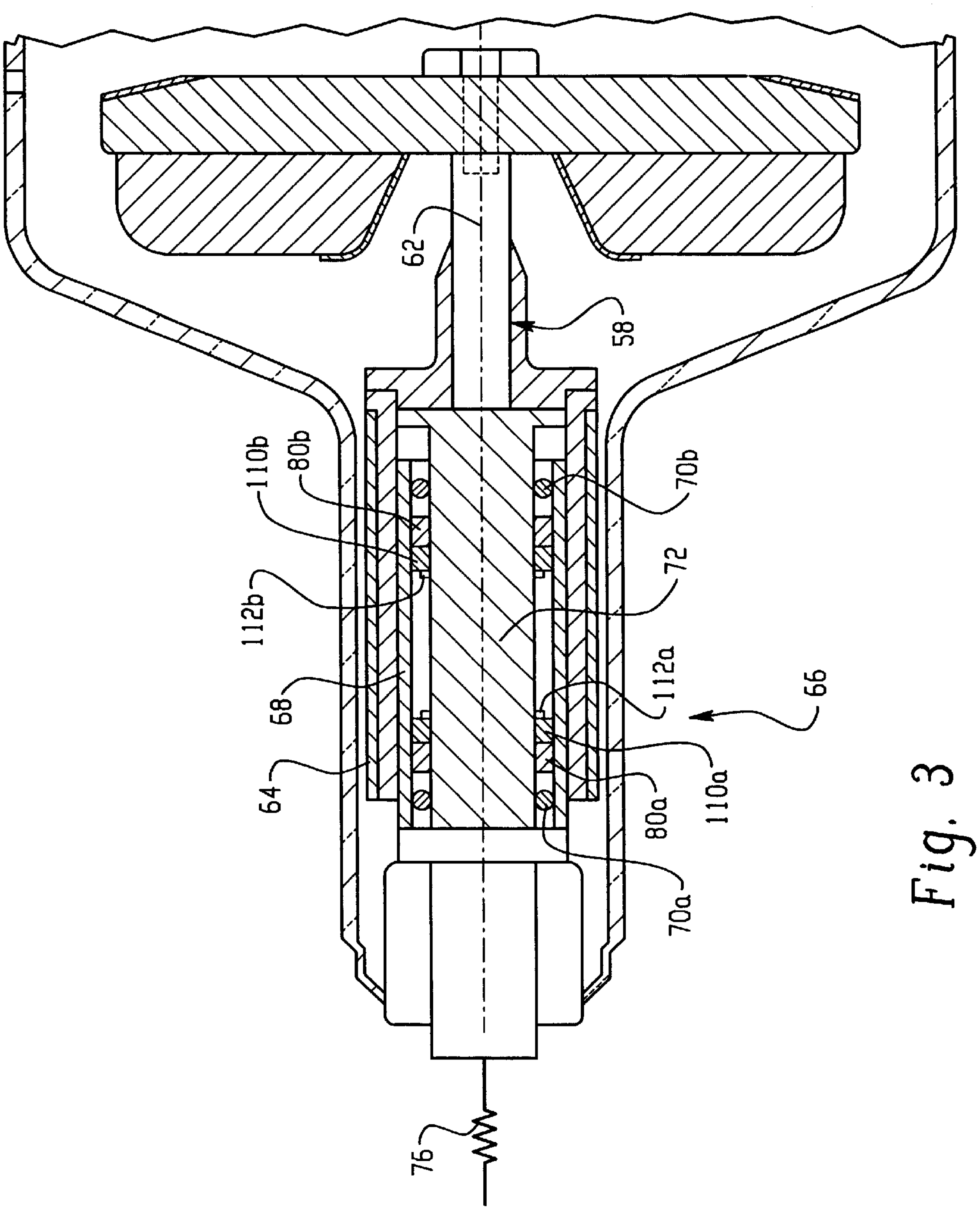
FIG. 3 is a partial sectional schematic representation of an x-ray tube showing the temperature log apparatus mounted to a bearing assembly according to an embodiment applying principles of the present invention.

In FIG. 3, temperature logs 80*a,b* are shown mounted on the bearing shaft 72 adjacent to respective bearings 70*a,b*. Suitable springs 110*a,b* are placed adjacent to the temperature logs 80*a,b*. Retaining rings 112*a,b* secure the springs 112*a,b* adjacent to the temperature logs 80*a,b* in order to resiliently bias the bearings 70*a,b* in their desired operating positions.

A method for determining whether a component of an x-ray tube 24 has been exposed to a particular temperature threshold value includes securing a temperature indicating member 100 at a selected location of a component within the evacuated envelope of the x-ray tube. Some suitable specific locations include the anode assembly 38, the cathode assembly 40 and the bearing assembly 66. As described above, the temperature indicating members 100 have a temperature sensitive characteristic for observably indicating whether a temperature indicating member has been adequately exposed to a temperature threshold value. One method of securing the temperature indicating member 100 at a desired location includes mounting the temperature indicating member 100 to a frame 82. The frame 82 is in thermally conductive contact with the selected location of the component of the x-ray tube.

Once the temperature log 80 is suitably secured in the x-ray tube, voltage and current are applied to the anode assembly 38 and cathode assembly 40 such that heat is produced in the x-ray tube. The electric power applied to the x-ray tube includes voltage and current suitable for manufacturing processes such as evacuating the tube and seasoning as well as the range of power that may be applied during x-ray tube operation in installed x-ray tubes in the field.

In order to determine whether a particular component or portion thereof has been adequately exposed to a specific temperature threshold value, the frame 80 retaining the temperature indicating member 100 is retrieved from within the envelope 34. If the temperature indicating member 100 is encapsulated within the threaded bore 92 with a set screw 102, or equivalent sealing device, the frame 80 is opened by removing the set screw 102 to expose the temperature indicating member 100. The temperature indicating member 100 is analyzed for observable changes as described above to determine whether the component has been adequately exposed to the temperature threshold or whether it has been exceeded. For example, the color, shape or structure is compared with the original known state of the temperature indicating member 100.

While a particular feature of the invention may have been described above with respect to only one of the illustrated embodiments that applies principles of the present invention, such features may be combined with one or more other features of other embodiments, as may be desired and advantageous for any given particular application.

From the above description of the invention, those skilled in the art will perceive improvements, changes and modification. Such improvements, changes and modification within the skill of the art are intended to be covered by the appended claims. For example, the invention has been described with respect to rotating anode x-ray tubes but its principles are applicable to stationary anode x-ray tubes. In addition, different temperature indicating elements having different temperature sensitive characteristics can be used with the apparatus. The temperature sensitive characteristic of the first temperature indicating member can be a different temperature sensitive characteristic than the temperature sensitive characteristic of the second temperature indicating member.

Having described a preferred embodiment of the invention, the following is claimed:

1. An x-ray tube comprising:

an insert including an evacuated envelope, an anode assembly and cathode assembly, the anode assembly and cathode assembly located in operative relationship to one another within the evacuated envelope; and a temperature indicating member located in thermally conductive contact with a component of one of the assemblies located in the insert, the temperature indicating member having a temperature sensitive characteristic which results in observable change in the temperature indicating member in response to thermal exposure to at least one temperature threshold value.

2. The x-ray tube of claim 1 wherein the temperature sensitive characteristic of the temperature-indicating member is a change in color.

3. The x-ray tube of claim 2 wherein the change in color of the temperature indicating member is irreversible.

4. The x-ray tube of claim 1 wherein the temperature sensitive characteristic of the temperature indicating member is a change in physical state of the member.

5. The x-ray tube of claim 1 including a frame for supporting the temperature indicating member, the frame adapted to be located in direct thermal contact with the component of the assembly in the insert.

6. The x-ray tube of claim 5 wherein the frame has a recess for receiving the temperature indicating member.

7. The x-ray tube of claim 1 including a cover for retaining the temperature indicating member within the recess.

8. The x-ray tube of claim 7 wherein the recess is threaded and the cover is a set screw received in the threaded recess.

9. The x-ray tube of claim 1 wherein the temperature sensitive characteristic provides a first observable change in the temperature indicating member which indicates exposure to a first temperature threshold value and a second observable change in the temperature indicating member for indicating exposure to a second temperature threshold value different than the first threshold temperature value.

10. The x-ray tube of claim 9 wherein the first temperature threshold value is the solidus temperature of the temperature indicating member and the second temperature threshold value is the liquidus temperature of the temperature indicating member.

11. The x-ray tube of claim 1 including a first temperature indicating member and a second temperature indicating member, the first temperature indicating member having a temperature sensitive characteristic for indicating exposure to a first temperature threshold value and the second temperature indicating member having a temperature sensitive characteristic for indicating exposure to a second temperature threshold value different than the first threshold temperature value.

12. The x-ray tube of claim 11 wherein the temperature sensitive characteristic of the first temperature indicating member is a different temperature sensitive characteristic than the temperature sensitive characteristic of the second temperature indicating member.

13. An x-ray tube comprising:

an envelope;

an anode assembly enclosed within the envelope;

a cathode assembly enclosed within the envelope, the cathode assembly in operative relationship with the anode assembly; and means for indicating exposure to a threshold temperature, the means for indicating having a temperature sensitive characteristic that is observably affected by exposure to the threshold temperature and the means for indicating is located within the envelope in thermally conductive contact with a portion of at least one of the anode assembly or cathode assembly.

14. The x-ray tube of claim 13 wherein the temperature sensitive characteristic of the means for indicating provides a first observable indication for indicating exposure to a first temperature threshold value and a second observable indication for indicating exposure to a second temperature threshold value different than the first threshold temperature value.

15. The x-ray tube of claim 13 wherein the means for indicating is a temperature sensitive material that melts upon adequate exposure to the threshold temperature.

16. The x-ray tube of claim 13 including a frame for retaining the means for indicating in thermally conductive contact with the portion of the at least one of the anode assembly or cathode assembly.

17. The x-ray tube of claim 13 wherein the means for indicating includes a first indicator member and a second indicator member, the first indicator member having a temperature sensitive characteristic for indicating exposure to a first threshold temperature value and the second indicator member having a temperature sensitive characteristic for indicating exposure to a second threshold temperature value different than the first threshold temperature value.

18. A method for determining whether a component within an evacuated envelope of an x-ray tube including an anode assembly and a cathode assembly has been exposed to a temperature threshold value, the method including the steps of:

securing a temperature indicating member at a selected location of a component within the evacuated envelope of the x-ray tube, the temperature indicating member having a temperature sensitive characteristic for observably indicating whether a temperature threshold value has been exceeded;

applying voltage and current to the anode assembly and cathode assembly tube such that heat is produced in the x-ray tube; and analyzing the temperature indicating member to determine whether the temperature threshold has been exceeded at the selected location of the component in the x-ray tube.

19. The method of claim 18 wherein the step of securing the temperature indicating member includes mounting the temperature indicating member to a frame, the frame in thermally conductive contact with the selected location of the component.

20. The method of claim 19 including the steps of:

retrieving the frame retaining the temperature indicating member from within the envelope; and opening the frame to expose the temperature indicating member to determine whether the temperature threshold has been exceeded.

* * * * *